(12) United States Patent
Morandini et al.

(10) Patent No.: US 10,503,286 B2
(45) Date of Patent: Dec. 10, 2019

(54) HOUSEHOLD APPLIANCE WITH A USER INTERFACE ELEMENT

(71) Applicant: Electrolux Appliances Aktiebolag, Stockholm (SE)

(72) Inventors: Stefano Morandini, San Vito al Tagliamento (IT); Andrea De Pellegrin, San Foca di San Quirino (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 389 days.

(21) Appl. No.: 15/352,636

(22) Filed: Nov. 16, 2016

(65) Prior Publication Data

US 2017/0139490 A1    May 18, 2017

(30) Foreign Application Priority Data

Nov. 16, 2015  (EP) ..................... 15194759

(51) Int. Cl.

| | |
|---|---|
| *G06F 3/0362* | (2013.01) |
| *G06F 3/0482* | (2013.01) |
| *F21V 23/04* | (2006.01) |
| *H05B 37/02* | (2006.01) |
| *F21V 33/00* | (2006.01) |
| *D06F 39/02* | (2006.01) |
| *D06F 39/00* | (2006.01) |

(Continued)

(52) U.S. Cl.
CPC ............ *G06F 3/0362* (2013.01); *D06F 25/00* (2013.01); *D06F 39/005* (2013.01); *D06F 39/02* (2013.01); *D06F 58/28* (2013.01); *F21V 23/04* (2013.01); *F21V 33/0044* (2013.01); *G06F 3/0482* (2013.01); *H05B 37/029* (2013.01); *D06F 2058/2803* (2013.01); *F21W 2131/30* (2013.01); *F21Y 2115/10* (2016.08)

(58) Field of Classification Search
CPC ...... G06F 3/0362; G06F 3/0482; D06F 25/00; D06F 39/005; D06F 39/02; D06F 58/28; D06F 2058/2803; F21V 23/04; F21V 33/0044; F21Y 2115/10; F21W 2131/30; H05B 37/029
USPC ............................................ 340/3.71, 815.45
See application file for complete search history.

(56) References Cited

U.S. PATENT DOCUMENTS

| 5,782,012 A | 7/1998 | Sanders et al. |
|---|---|---|
| 2003/0024281 A1 | 2/2003 | Peterson et al. |

(Continued)

FOREIGN PATENT DOCUMENTS

| CN | 204434991 U | 7/2015 |
|---|---|---|
| DE | 4031266 A1 | 4/1992 |

(Continued)

OTHER PUBLICATIONS

European Communication Pursuant to Article 94(3) for European Application No. 15 194 759.5, dated Oct. 19, 2018, 5 pages.

(Continued)

*Primary Examiner* — Edwin C Holloway, III
(74) *Attorney, Agent, or Firm* — RatnerPrestia

(57) ABSTRACT

A household appliance (2) has a drawer (30), a user interface element (44) and a light group (50) having a plurality of light elements (54). The light elements (54) are disposed substantially peripherally with respect to the user interface element (44). The light group (50) is arranged on a side of the user interface element (44) opposite to the drawer (30).

15 Claims, 3 Drawing Sheets

(51) Int. Cl.
*D06F 25/00* (2006.01)
*D06F 58/28* (2006.01)
*F21Y 115/10* (2016.01)
*F21W 131/30* (2006.01)

(56) References Cited

U.S. PATENT DOCUMENTS

| | | |
|---|---|---|
| 2003/0024796 A1 | 2/2003 | Peterson et al. |
| 2005/0178167 A1* | 8/2005 | Kim ............... D06F 39/005 68/12.27 |
| 2005/0183469 A1* | 8/2005 | Kang ............... D06F 39/12 68/3 R |
| 2006/0164397 A1 | 7/2006 | Bruntz et al. |
| 2009/0201124 A1* | 8/2009 | Kim ............... D06F 39/005 340/3.71 |
| 2010/0000024 A1 | 1/2010 | Hendrickson et al. |
| 2010/0043499 A1 | 2/2010 | Choi et al. |
| 2013/0107495 A1* | 5/2013 | Park ............... D06F 39/005 362/23.13 |
| 2013/0180840 A1 | 7/2013 | Boesner et al. |
| 2013/0255327 A1* | 10/2013 | Park ............... D06F 39/005 68/13 R |
| 2013/0271950 A1* | 10/2013 | Park ............... F21V 33/0044 362/23.07 |
| 2014/0049926 A1 | 2/2014 | Bas et al. |
| 2014/0131180 A1* | 5/2014 | Williamson ....... H01H 19/02 200/11 R |
| 2014/0137608 A1* | 5/2014 | Seikel ............... D06F 39/02 68/17 R |
| 2015/0299929 A1 | 10/2015 | Yang et al. |
| 2015/0299930 A1 | 10/2015 | Yang et al. |
| 2015/0315737 A1 | 11/2015 | Yang |
| 2017/0137986 A1* | 5/2017 | De Luca ............ F21V 33/0044 |
| 2017/0137991 A1 | 5/2017 | De Pellegrin et al. |
| 2017/0235383 A1 | 8/2017 | Goss et al. |
| 2019/0003102 A1 | 1/2019 | Lv et al. |

FOREIGN PATENT DOCUMENTS

| | | |
|---|---|---|
| DE | 19908363 A1 | 8/2000 |
| DE | 10261284 A1 | 7/2004 |
| EP | 1555684 A1 | 7/2005 |
| EP | 1884857 A1 | 2/2008 |
| EP | 2589696 A1 | 5/2013 |
| EP | 2620535 A1 | 7/2013 |
| EP | 2650422 A1 | 10/2013 |
| EP | 2933368 A1 | 10/2015 |
| EP | 2937455 A1 | 10/2015 |
| WO | 2015082127 A1 | 6/2015 |

OTHER PUBLICATIONS

Extended European Search Report dated Apr. 5, 2016 in corresponding European Application No. 15194759.5.
Extended European Search Report dated Apr. 20, 2016 in related European Application No. 15194771.0.
Extended European Search Reported dated Feb. 24, 2016 in related European Application No. 15194803.1.
European Communication Pursuant to Article 94(3) for European Application No. 15194759.5, dated Feb. 6, 2016, 5 pages.
Notice of Allowance for U.S. Appl. No. 15/352,621, dated Mar. 8, 2019, 6 pages.
Final Office Action for U.S. Appl. No. 15/352,645, dated Mar. 19, 2019, 11 pages.
Notice of Allowance for U.S. Appl. No. 15/352,645, dated Jul. 2, 2019, 20 pages.

* cited by examiner

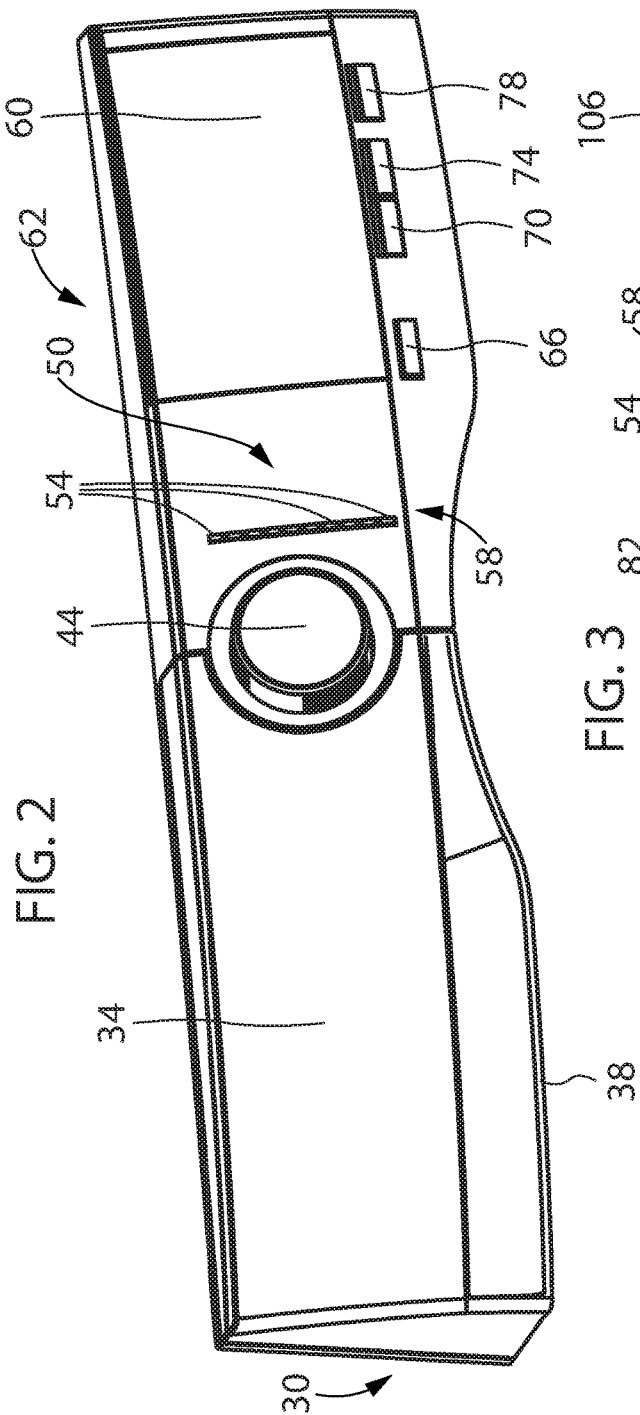
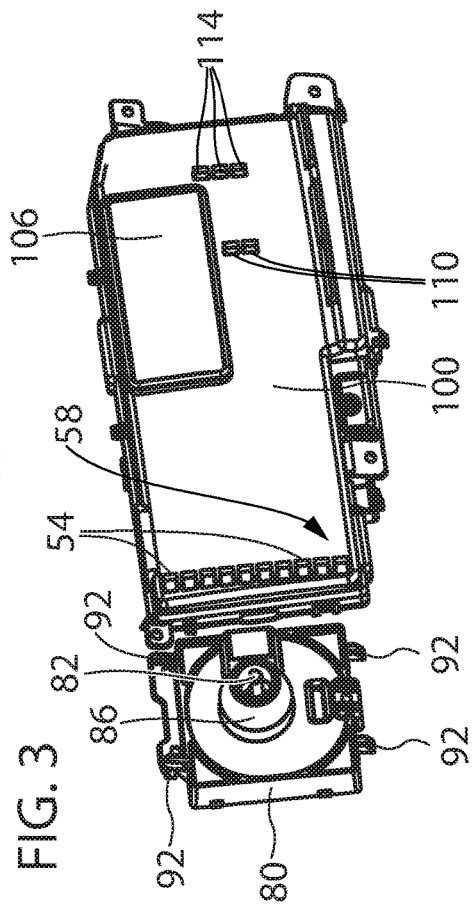

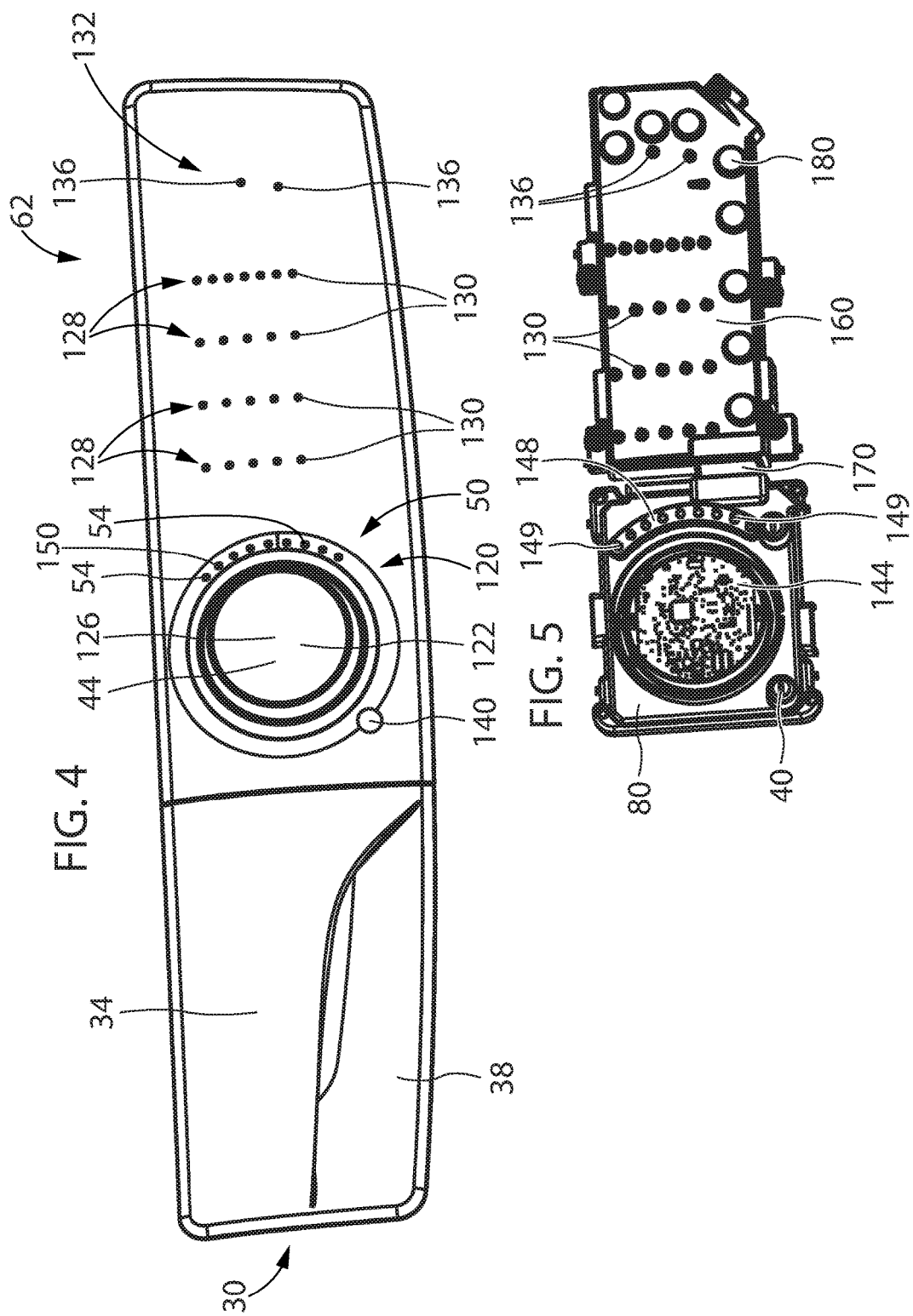

HOUSEHOLD APPLIANCE WITH A USER INTERFACE ELEMENT

CROSS REFERENCE TO RELATED APPLICATION

This application claims priority to European Application No. 15194759.5, filed Nov. 16, 2015, the content of which is hereby incorporated by reference in its entirety.

FIELD

The present invention generally relates to a household appliance, especially a washing machine, dryer or combined washer and dryer, both for domestic and professional use. More particularly, the present invention relates to a household appliance comprising a user interface element and a light group comprising a plurality of light elements being disposed substantially peripherally with respect to the user interface element.

BACKGROUND

Household appliances such as washing machines, dryers, especially tumble dryers, and combined washers/drawers are known which comprise a user interface element and a group of lights. The user interface element is usually used to select and/or to display a program or parameters of a selected program. Different versions of user elements are known such as rotary knobs or push buttons. Light elements on a user interface can indicate selected programs, options or states of the machine.

The DE 40 31 266 A1 describes a household appliance which comprises rotary user elements and user interface elements which are built as push switches for inputting programs or functions. While a rotary knob can be used to select a temperature for a washing routine for laundry, the push switches allow selecting additional functions.

The DE 199 08 363 A1 discloses a program-controlled household appliance with a rotatable user interface element which is built as a rotational knob and push-button switches. The rotational knob at three positions is surrounded by three light elements which correspond to three program groups. If the knob position corresponds to a selection of an item of one of these groups, the corresponding light element is illuminated. A vertical row of light elements is configured to indicate the degree of drying reached, by respective illumination. A further light element in this row indicates the activation of an anti-crease-program or the end of the selected program.

The light arrangement on such household appliances usually takes a considerate space on a user-accessible part of the washing machine and is not available for other devices or user interacting components which for user accessibility are arranged in a similar region of the appliance.

SUMMARY OF SELECTED INVENTIVE ASPECTS

An object of aspects of the present invention is therefore to provide a household appliance with an optimized arrangement of light elements.

A further object of aspects of the present invention is to provide a cheaper user interface element which is easier to assemble.

It is a further object of aspects of the present invention to provide a household appliance which is more compact and easier to assemble.

An object of aspects of the invention is solved by a household appliance, comprising a drawer, a user interface element and a light group comprising a plurality of light elements, the light elements being disposed substantially peripherally with respect to the user interface element, wherein the light group is arranged on a side of the user interface element opposite to the drawer.

Aspects of the invention are based on the consideration that the household appliance usually comprises at least an area, mostly on its front side, which is dedicated for user interactions and operations. Additionally, this area provides possibilities for the user to interact with and program the appliance and to obtain feedback about the current status of the machine. To this end, at least one user interface element is provided as well as indication means. Moreover, in this region of the appliance a drawer is usually arranged which can be filled by the user with detergent and/or additives. These different components can lead to a trade-off regarding the proper dimensioning and arrangement of the various components.

Applicant has found that an optimized utilization of the available space can be achieved by arranging the light elements on a side of the user interface element opposite to the drawer. This configuration allows dimensioning the drawer that it reaches up to the user interface element, providing enhanced lateral space for the drawer. This allows increasing the volume of the drawer compartments if desired and allows constructing a comfortable handle. On the opposite side of the drawer, the light elements can be positioned, yielding a clear subdivision of a front portion of an appliance.

The plurality of light elements are preferably interrelated with each other in a sense that their switching on/off are alternatively/successively/logically linked with each other for the indication of parameters preferably belonging to the same field, in particular through the operation of the user interface element.

Preferably on the side of the user interface element opposite the light group, only the drawer is visible to a user. This provides a very clean arrangement, since to the user, all light elements of the light group are presented on only one side of the user interface element. Preferably, no light elements are arranged between the drawer and the user interface element.

Advantageously, the distance of the respective light element of the light group to a center of said user interface element is considerably smaller than the distance of the center of the user interface element to a center of a front plate/cover of said drawer. The light elements are peripheral and close to the user interface element, which can indicate the functional connection between user interface element and the illumination of respective light elements.

In a preferred embodiment, the user interface element is a rotatable knob and/or push button and/or a display. The user interface element can, in a preferred variant, be a rotational knob with a display in its center, whereby the latter displays information in correspondence to the rotational position of the button and/or displays other information relating to the machine programs/parameters.

Preferably, the light elements of the light group are arranged along a row.

Advantageously, the light elements of the light group are arranged along a rounded row, this row being concentric with said user interface element. Accordingly, the light elements are disposed at different angular positions with respect to a knob axis or center. Preferably the rounded row is essentially shaped as a segment of a circle.

Alternatively, the light elements of the light group are arranged along a linear row substantially vertical or perpendicular with respect to the width of said appliance. The term "width" here denotes the lateral direction/extension of the appliance in a mounted position which is the position for regular operation of the appliance.

In a preferred embodiment, a user interface is provided, whereby the light elements are associated with the user interface or adjacent to the user interface.

The user interface preferably comprises at least one further light element and/or display element, which preferably is an LCD. The display element is preferably used to indicate program state and/or options and/or error or maintenance messages to user.

The user interface element is advantageously arranged on the user interface.

Alternatively, the user interface element is arranged on a module different from said user interface.

In order to facilitate the assembly of the household appliance and to provide a compact design, the user interface element and the plurality of light elements are preferably integrated in a common module. In this way, a convenient way to assemble the household appliance is provided and replacements are convenient to perform.

Advantageously, at least one switch is arranged between the user interface element and the drawer. Preferably, said switch can be provided on the user interface or on a module different of said user interface. According to a preferred embodiment, a common module, different from said user interface, can integrate the user interface element, the light group and preferable said at least one switch.

Preferably this switch is used to start and/or stop and/or confirm a selected program.

The illumination of a respective light element, preferably one of the light group, preferably depends on an operative and/or positional state of the user interface element. The states of the user interface element can comprise: rotated, pressed/pushed, moved upward/downward, program selected and/or shown on a display. The light elements in this way are essentially activated or deactivated by the state of the user interface element.

In a preferred embodiment, the user interface element is a rotatable knob, whereby the illumination of a respective light element of the light group depends on the angular movement of the knob. Preferably, the illumination of the light elements depends on the, especially rotational, position of the knob; according to an alternative embodiment of the present invention, the illumination of each light element depends on the illumination sequence of the light elements comprised on the light group as a whole, with respect to the knob rotation direction.

Advantageously, each light element of the light group is associated with a text and/or symbol indicating a selected cycle and/or program.

The light elements of the light group are preferably directly visible to the user. Preferably at least one light guide is associated with the light elements, guiding the light towards the external side of the appliance.

Preferably, the household appliance is built as a laundry washing machine or combined laundry washing machine and dryer.

Advantages of aspects of the invention are essentially as follows. The arrangement of the light group increases the available lateral space for the drawer, and also allows a volume increasing to the respective compartment of the drawer. Also the available lateral space for the handle of the drawer is increased, making its handling comfortable for the user.

The described arrangement of light elements in addition provides a clear-cut design in which the user element separates two regimes: the drawer and the user interaction/feedback regime. The possibility to overlook an indicator is reduced since their position is clearly defined to be on only one side of the user interface element.

There is furthermore the possibility to have the LEDs programs on the selector electronics board or on the user interface electronic board. With the light group being arranged on one side only, the choice to incorporate the lights on a separate module or on the lateral side of the user interface electronic board becomes easier.

BRIEF DESCRIPTION OF THE DRAWINGS

Further features and advantages of the present invention shall become clearer from the following detailed description of some of its preferred embodiments, made with reference to the attached schematic drawings and given as an indication and not for limiting purposes.

In particular, the attached drawings are included to provide a further understanding of the invention and are incorporated in and constitute a part of this specification. The drawings together with the description explain the principles of the invention. In the drawings, corresponding characteristics and/or components are identified by the same reference numbers. In these drawings:

FIG. 2 shows a knob, a cover, a drawer, a light group and a user interface of the laundry washing machine according to FIG. 1 in a preferred embodiment;

FIG. 3 shows components hidden in FIG. 2 behind knob and cover;

FIG. 4 shows a knob, a cover, a drawer, a light group and a user interface of a laundry washing machine in another preferred embodiment; and FIG. 5 shows components hidden in FIG. 4.

DETAILED DESCRIPTION OF EXAMPLE EMBODIMENTS

Figure 1:
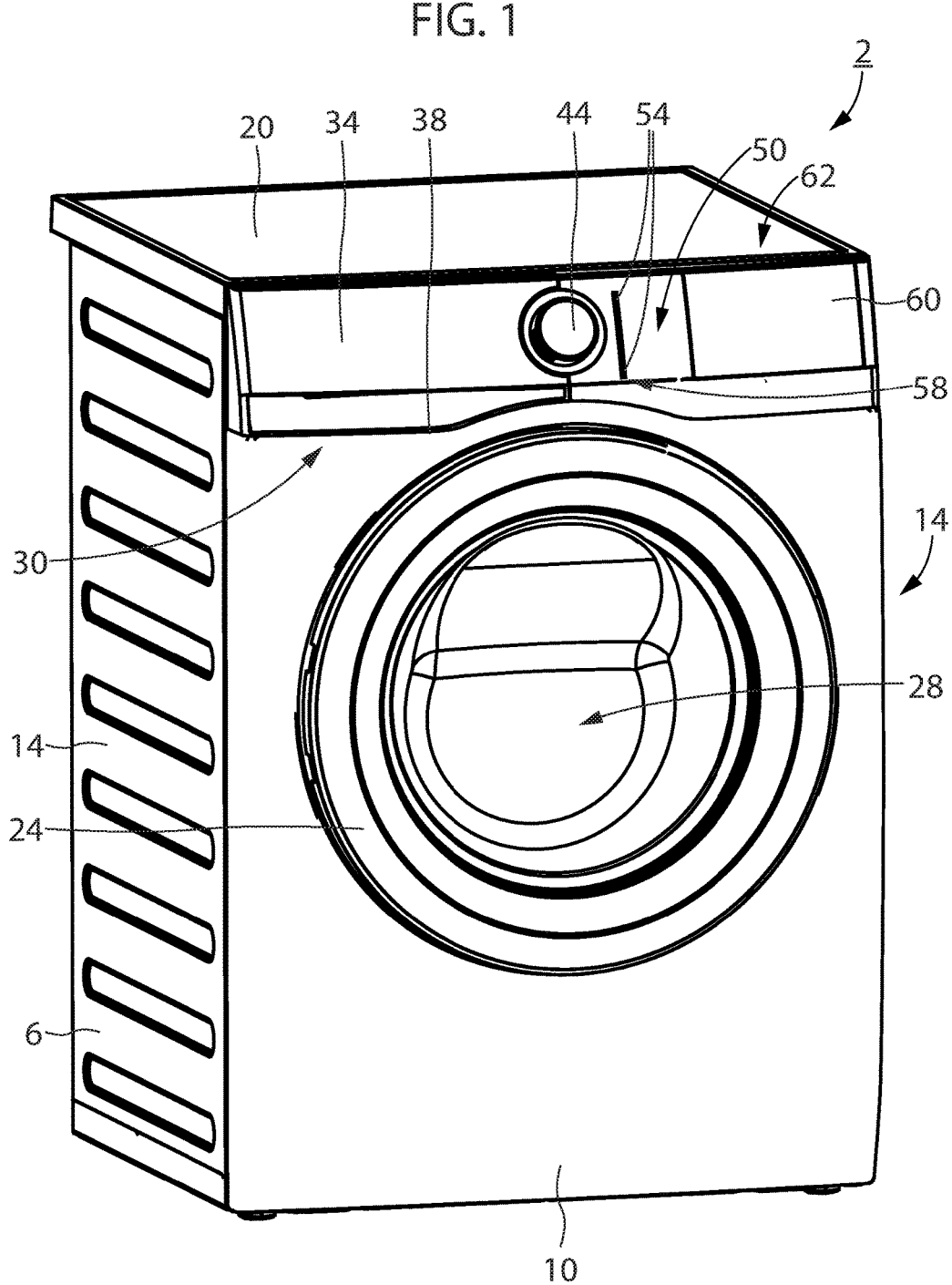
FIG. 1 shows a laundry washing machine in a preferred embodiment.

In FIG. 1, a household appliance which is built as a laundry washing machine 2 is shown which is preferably built as a front-loading washing machine and comprises a housing or casing 6 with a preferable parallelepiped shape, the casing 6 comprising a front wall 10, two side walls 14, a cover plate 20 and a rear plate (not shown). Front wall 10 and side walls 14 are preferably part of a cabinet. A front door 24 is provided which can be opened for loading or unloading laundry through an opening 28 into a washing drum.

Advantageously a washing tub is contained within casing 6, whereby a rotatable and perforated drum is contained by said washing tub. Both washing tub and drum have a substantially cylindrical shape. Advantageously the tub is suspended in a floating manner inside casing 6 by means of a number of coil springs and shock absorbers. The drum is rotated by an electric motor (not shown), which transmits the rotating motion of a motor shaft to the drum by a belt/pulley system. In a different embodiment of the invention, the motor can be directly associated with the shaft of the drum. The tub is preferable connected to casing 6 by means of an elastic bellows or gasket. Alternatively, the laundry appliance can be a dryer (in which case the tub is not provided) or a combined washer and dryer.

The preferred washing machine shown in FIG. 1 comprises a drawer 30 with a front plate 34 and a handle 38 for pulling out and pushing back in drawer 30. Drawer 30 comprises at least one compartment for detergent or washing additives. Adjacent to drawer 30, a user interface element, preferably a rotatable knob 44, is arranged for preferably selecting a laundry treatment program and/or at least one parameter of a laundry treatment program. According to a preferred embodiment of the present invention, the user interface element can be a rotatable knob and/or a push button and/or a display, or generally any user interacting component allowing an active interaction (through choice/adjustment of programs/parameters) and/or a passive interaction (through the display of programs/parameters) between the user and the machine.

Adjacent to knob 44 on the opposite side of drawer 30, a light group 50 is arranged which comprises a plurality of light elements 54 of which in FIG. 1 only two are labelled. Light elements 54 preferably form a light row 58, which in the mounting position of laundry washing machine 2 is preferably arranged vertically and perpendicular to the lateral extension (width) of laundry washing machine 2. The mounting position shown is the regular orientation of the washing machine for operation. Each of said light elements 54 is preferably built as an LED.

Preferable, the plurality of light elements are interrelated with each other in a sense that their switching on/off is alternatively/successively/logically linked with each other for the indication of parameters preferably belonging to the same field, in particular through the operation of the user interface element.

On the side of light row 58 opposite to the side where the user interface element/drawer are provided, a transparent inlay or cover 60 is arranged which preferably covers the user interface or a portion thereof, such as a display, preferably an LCD. Cover 60, light group 50 and knob 44 are components of a user interface 62 which allows a user to control laundry washing machine 2, especially to select a laundry treatment program and/or at least one parameter and also to obtain information on the current status of laundry washing machine 2.

In FIG. 2, user interface 30 and drawer 30 of laundry washing machine 2 are shown in an enlarged view. Shown in addition is a push buttons 66 and three further push buttons 70, 74, 78 preferably suitable for adjustment of further parameters or the selection of further programs. The light elements 54 of light group 50 are preferably associated with knob 44 in such a way that at least for a subgroup of light elements 54, the illumination of each light element 54 corresponds to exactly one rotational position of knob 44. The state in which no light element 54 is illuminated corresponds preferably to an initial position of knob 44 in which neither a program nor a parameter is selected. Also illumination of subgroups of light elements 54 and/or of all light elements 54 can correspond to different states of knob 44.

Alternatively, only one light element 54 is illuminated, i.e. no a plurality of light elements 54 is illuminated contemporaneously. Preferably, light elements 54, which are preferably LEDs, are illuminated in a sequence from the upper light element to the bottom one or vice versa in dependence of the user interface element adjustment or movement, for example in dependence on the clock or counter-clock rotation of the knob, respectively.

Preferably, the lights elements 54 composing the light group 50 interact with each other;

preferably the illumination of each light element depends on the illumination sequence of the light elements comprised on the light group as a whole, with respect to the knob rotation direction.

According to a preferred embodiment, when the appliance is switched on, the upper light element 54 or LED of an essentially vertically arranged light group 50 is illuminated; preferable, the illumination of said LED corresponds to a description of a program/parameter placed/marked on the user interface 30 in correspondence/laterally to the illuminated LED. If the user wants to change the program, she/he can rotate the knob 44 in the clockwise direction, until to the next rest rotational position of said knob is reached. Due to said knob rotational movement, the upper LED is switched off, whereas the adjacent LED, placed on the bottom side with respect to the first, is illuminated; the illumination of the second led can preferably correspond to a different program/parameter, the name of which is marked on said user interface in correspondence to/laterally to said LED.

If the user rotates the knob in the clockwise direction too, the second LED switches off and the third LED illuminates, and so on; on the other hand, if the user rotates the knob in the counterclockwise direction, the second LED is switched off and the first LED is illuminated; therefore, on said preferred embodiment, the LEDs are illuminated according to a sequence corresponding to the switching on of a LED followed by a substantial contemporaneous switch off of a LED that is adjacent with respect to those just switched on; if the illuminated LED has two adjacent LED, the illumination of one respect of the other preferably depends of the direction of the knob rotation.

Further preferable, if the illuminated LED has exactly one adjacent LED only, because for example it is the LED provided on the extremity of the LED row, it the user rotates the knob in the direction opposite to the direction necessary for illuminating the adjacent LED, the illuminating sequence can be configured to illuminate the LED of the opposite extremity with respect to those yet switched off.

According to a preferable alternative embodiment, the LEDs are illuminated in sequence, without the switching off of the previous one; for example, when the appliance is switched on, the upper LED is illuminated; if the knob is rotated in a clockwise direction, the second LED, adjacent to and placed on the bottom side of the upper one, is illuminated; if the knob is rotated in a clockwise direction too, also the third led is illuminated, and so on; in case the knob is rotated in the counterclockwise direction, the second LED is switched off.

Therefore, using the same principle of the above described preferred embodiments, the LEDs are switched on or switched off in sequence, depending of the rotation direction of the knob, but keeping switching off/on if the next/previous LED has to switch off/on, respectively.

Due to the described association of knob 44 and light elements of light group 50, the user obtains a clear and immediate feedback on her or his current selection.

The push buttons 66, 70, 74, 78 which are arranged below display 60 can preferably be used to adjust further parameters or select of further programs as explained above. While light elements 54 of light group 50 are, as described, preferably related to the knob 44 in a sense that they yield optical feedback on the current position/state of knob 44, a display arranged beneath cover 60 (see below) is preferably used to provide to the user information on the selected program, the parameters, the remaining treatment time, possible error or maintenance related messages etc.

As can be inferred from both FIGS. 1 and 2, light elements 54 are only arranged on the side of knob 44 which is opposite to drawer 30. In other words, no light elements 54 and therefor no light group 50 are arranged between knob 44 and drawer 30. The light elements 54 and all other components which are part of or arranged on user interface 62 are positioned on the side of knob 44 opposite to drawer 30; consequently, on the side of the user interface element opposite to the light group 50, only the drawer is visible to a user. In this way, the lateral space available for the drawer 30 and/or for the drawer handle 38 is larger compared to common designs where lights are arranged on both sides of the user interface element or knob 44.

Additionally, the user is presented with a clear-cut layout of parts and components. All controls and display elements are arranged on the same side with respect to the drawer 30, in the shown example on the right side of knob 44 with respect to the frontal view of the household appliance. This reduced confusion of a user, who might not be able to recognize which controls are of importance or might simply overlook certain controls or display or indication elements.

In FIG. 3, in which the knob 44 and the cover 60 are not shown, a first preferred embodiment about the application of the user interface element encoder and of the light group 50 is depicted. In said preferred embodiment, a box 80 is configured for receiving the encoder of the knob 44 and transmitting its position to a control unit (not shown). The control unit, for instance, accesses light elements 54 to illuminate them according to the position of the encoder and of the knob 44. Said encoder comprises a pin 82 which is received by a hull or sheath of knob 44 and also provides a protection wall 86 merging from the box 80. Box 80 preferably comprises four connecting elements 92 for connecting said knob to a support frame deriving from/provided on the front wall 10.

An electric board 100 comprises the light elements 54 as well as a display 106 for displaying information regarding the machine state, the selected program etc. as described above. Component 100 also provides further light elements 110 and further light elements 114. Preferably, either on component 100 and/or on cover 60, symbols or texts are provided related to light elements 110, 114.

In FIG. 4, a front part of a laundry treatment machine 2 in another preferred embodiment is shown. The light group 50 of light elements 54 in this embodiment are arranged a rounded row 120; as shown in FIG. 4, the light elements are, respectively, disposed at a different angle with respect to the knob 44. The light elements 54 are thereby arranged along a segment of a circle which is concentric with a middle axis of knob 44 which is perpendicular to its surface 122.

The bent or rounded arrangement of light elements 54 has two advantages. Firstly, by the close positioning around knob 44, in which every light element 54 preferably has the same distance to a center 126 of knob 44, space on user interface for other user interface components is provided. Secondly, the arrangement of the light group 50 of light elements concentric with knob 44 clearly and in an intuitive way indicates to the user the connection or link between the illumination of one or several light elements 54 and the rotational state of knob 44. According to said preferred embodiment, the user interface element comprises a knob and a display placed internally, fixed in a non-rotatable manner to the box 80 (see below), and so to the household appliance.

On user interface 62, four light rows 128 with, respectively, five light elements 130 are arranged as well as one light row 132 with two light elements 136. Between knob 44 and drawer 30, a switch 140 is provided, preferably of the touch-sensitive type. Switch 140 is preferably used to start and/or pause and/or stop a selected laundry treatment program.

In FIG. 5 the knob and the front panel have not been shown, depicting a second preferred embodiment, wherein the user interface element 44, the light group 54 and preferable the switch 40 are integrated on the box 80; the latter holds a control circuit board 144 suitable to comprise the control unit that preferably receives the signal from the user interface element and to manages the illumination of the light elements comprised on the light group. Preferable, said lights comprised on the light group are associated with a light guide 148 configured to transmit the light from each light element to a respective external protrusion 149 provided on said light guide, emitting the light to the external side of the front panel, passing through holes 150 provided on the latter. Preferably, said integrated box 80 is electrically connected with the main board 160 of the user interface through an electrical connection 170 laterally placed between them. On main board 160, touch sensitive switches 180 are arranged which enable the user to adjust parameters and/or (sub-) programs or to start/confirm additional operations. The operation or switching of the touch sensitive switches 180 preferably leads to a change of illumination of at least one light belonging to light rows 128.

While the present embodiment shown is a laundry washing machine, aspects of the invention also encompass combined washers and dryers or dryers with a drawer.

The invention thus conceived can be subjected to numerous modifications and variants all falling within the scope of the inventive concept.

In addition, all details can be replaced by other technically equivalent elements.

In practice, all the materials used, as well as the shapes and contingent dimensions, may vary depending on the requirements without departing from the scope of protection of the following claims.

The invention claimed is:

1. A household appliance, comprising:
   a user interface element including rotatable knob;
   a drawer arranged on a first side of said rotatable knob; and
   a light group comprising a plurality of light elements, said light elements being disposed substantially peripherally with respect to said rotatable knob,
   wherein the light elements of said light group are arranged along a rounded row, said rounded row being concentric with said rotatable knob, and the light elements are arranged on a second side of said rotatable knob opposite to said drawer, and
   wherein no light elements are arranged on said first side between said drawer and said rotatable knob.

2. The household appliance according to claim 1, wherein on the side of the user interface element opposite to said light group, only said drawer is visible to a user.

3. The household appliance according to claim 1, wherein said light elements of said light group are arranged along a rounded row, said rounded row being concentric with said user interface element.

4. The household appliance according to claim 1, wherein said light elements of said light group are arranged along a linear row substantially vertical with respect to the width of said appliance.

5. The household appliance according to claim 1, wherein a user interface is provided, and whereby said light elements are associated with said user interface or adjacent to said user interface.

6. The household appliance according to claim 5, wherein said user interface comprises at least one further light element and/or display element.

7. The household appliance according to claim 5, wherein said user interface element is arranged on said user interface.

8. The household appliance according to claim 1, wherein, said user interface element and said plurality of light elements are integrated in a common module.

9. The household appliance according to claim 1, wherein at least one switch is arranged between said user interface element and said drawer.

10. The household appliance according to claim 8, wherein said at least one switch is integrated into said common module.

11. The household appliance according to claim 1, wherein the illumination of a respective light element depends on an operative/positional state of said user interface element.

12. The household appliance according to claim 11, whereby the illumination of a respective light element of said light group depends on the angular movement of said knob.

13. The household appliance according to claim 1, wherein said light elements of said light group are directly visible to a user or whereby at least one light guide is associated with said light elements, guiding the light towards the external side of said appliance.

14. The household appliance according to claim 1, wherein the appliance is a laundry washing machine or combined laundry washing machine and dryer.

15. A household appliance, comprising:
a user interface element including rotatable knob;
a drawer arranged on a first side of said rotatable knob; and
a light group comprising a plurality of light elements, said light elements being disposed substantially peripherally with respect to said rotatable knob,
wherein said light group is arranged on a second side of said rotatable knob opposite to said drawer,
wherein no light elements and no appliance control elements are arranged on said first side between said drawer and said rotatable knob, and
wherein a border between said first side of said rotatable knob and said second side of said rotatable knob intersects said rotatable knob.

\* \* \* \* \*